(12) United States Patent
Tsai

(10) Patent No.: US 11,001,111 B2
(45) Date of Patent: May 11, 2021

(54) CHASSIS SYSTEM OF AMPHIBIOUS REMOTE CONTROL VEHICLE

(71) Applicant: Jason Toys & Electronics Co., Ltd., New Taipei (TW)

(72) Inventor: Min-Lan Tsai, New Taipei (TW)

(73) Assignee: Jason Toys & Electronics Co., Ltd., New Taipei (TW)

( * ) Notice: Subject to any disclaimer, the term of this patent is extended or adjusted under 35 U.S.C. 154(b) by 15 days.

(21) Appl. No.: 16/698,009

(22) Filed: Nov. 27, 2019

(65) Prior Publication Data

US 2020/0369104 A1    Nov. 26, 2020

(30) Foreign Application Priority Data

May 22, 2019    (TW) .................................. 108206423

(51) Int. Cl.
*B60F 3/00*    (2006.01)
(52) U.S. Cl.
CPC .......... *B60F 3/0038* (2013.01); *B60F 3/0007* (2013.01)
(58) Field of Classification Search
CPC ........ B60F 3/00; B60F 3/0038; B60F 3/0007; B60F 3/0061; B60F 3/003
See application file for complete search history.

(56) References Cited

U.S. PATENT DOCUMENTS

| | | | | |
|---|---|---|---|---|
| 3,131,666 A | * | 5/1964 | Sessions | B60F 3/0007 440/12.54 |
| 2008/0108257 A1 | * | 5/2008 | Gibbs | B60G 3/20 440/12.51 |
| 2013/0130575 A1 | * | 5/2013 | Gibbs | B60F 3/0084 440/12.52 |

\* cited by examiner

*Primary Examiner* — Stephen P Avila
(74) *Attorney, Agent, or Firm* — Wang Law Firm, Inc.

(57) ABSTRACT

A chassis system of an amphibious remote control vehicle is provided, including a vehicle chassis and a hull form chassis, the vehicle chassis comprises a first joint portion and a second joint portion. The width of one end of the hull form chassis is smaller than that of one other end of the hull form chassis, the hull form chassis comprises a third joint portion being corresponding to the first joint portion and two fourth joint portions being corresponding to the second joint portion. The hull form chassis comprises a hull form chassis centerline, the hull form chassis centerline extends obliquely to two sides to form two inclined surfaces, the first joint portion is engaged with the third joint portion, and the second joint portion and the two fourth joint portion are combined by a fixing member.

8 Claims, 2 Drawing Sheets

CHASSIS SYSTEM OF AMPHIBIOUS REMOTE CONTROL VEHICLE

CROSS-REFERENCE TO RELATED APPLICATION

This application claims priority from Taiwan Patent Application No. 108206423, filed on May 22, 2019, in the Taiwan Intellectual Property Office, the content of which is hereby incorporated by reference in its entirety for all purposes.

BACKGROUND

1. Field

The present invention relates to a chassis system of a remote control vehicle. Particularly, the present invention relates to a chassis system that is replaceable and can effectively reduce the resistance in water for an amphibious remote control vehicle.

2. Description of the Related Art

Nowadays, in some of the conventional chassis systems of amphibious remote control vehicles, an inflatable floating device made of an elastic material is usually coupled to the body thereof to provide sufficient buoyancy to the vehicle while traveling on water, so it is necessary to inject gas into such device. However, with this design, even if the inflatable floating device gets slightly damaged, the vehicle may not be able to stably travel on water.

In some other chassis devices of amphibious remote control vehicles, multiple grid boxes are connected to each other to form a box structure and coupled to the chassis of the vehicle. The box structure may further be filled with a foaming material or an air bag to provide additional buoyancy which is required for the vehicle to travel on water. However, due to the excessive resistance in water results from the excessive volume of the number of boxes and the required connection structure thereof, the vehicle may still not be able to stably travel on water and further causes greater energy consumption.

For the purpose of improving the drawbacks of the prior art, the inventor of the present invention provides a chassis system of amphibious remote control vehicle.

SUMMARY

In view of the aforementioned problems, the purpose of the present invention is to provide a chassis system of an amphibious remote control vehicle comprising a vehicle chassis and a hull form chassis. The vehicle chassis comprises a first joint portion disposed at one end of the vehicle chassis and a second joint portion disposed at the other end of the vehicle chassis. The width of one end of the hull form chassis is smaller than that of the other end of the hull form chassis, the one end of the hull form chassis corresponds to the front end of the amphibious remote control vehicle, the other end of the hull form chassis corresponds to the rear end of the amphibious remote control vehicle. The hull form chassis further comprises a third joint portion disposed at one end of the hull form chassis being corresponding to the first joint portion and two fourth joint portions disposed at the other end of the hull form chassis being corresponding to the second joint portion. Wherein the hull form chassis comprises a hull form chassis centerline configured along an axial direction of the hull form chassis relatives to the vehicle chassis, the hull form chassis centerline extends obliquely to two sides of the hull form chassis to form two inclined surfaces, and the hull form chassis is V-shaped in a front view. The first joint portion is engaged with the third joint portion, and the second joint portion and the two fourth joint portion are combined by a fixing member, and then the hull form chassis is fixedly attached to the vehicle chassis.

Preferably, the one end of the vehicle chassis may correspond to the front end of the amphibious remote control vehicle and the other end of the vehicle chassis may correspond to the rear end of the amphibious remote control vehicle.

Preferably, the third joint portion may be a plate member extending from a side of the hull form chassis in a direction toward the vehicle chassis, and the third joint portion may have an L-shaped structure and may include a first fixing hole, the first fixing hole may be disposed on one side of the L-shaped structure parallel to the hull form chassis, and the hull form chassis may include a second fixing hole, and the second fixing hole may be disposed correspondingly to the first fixing hole, wherein when the first joint portion is engaged with the third joint portion, the first fixing hole and the second fixing hole are bored by a fixing element in order to further fix the first joint portion and the third joint portion which are engaged with each other.

Preferably, the two fourth joint portions may be plate members extending from a side of the hull form chassis in a direction toward the vehicle chassis, and each fourth joint portion may have a third fixing hole, and each sides of the second joint portion may respectively include a fourth fixing hole, wherein when the second joint portion is engaged with the fourth joint portion, each third fixing hole and each fourth fixing hole is bored by the fixing member in order to further fix the second joint portion and the fourth joint portion.

Preferably, the amphibious remote control vehicle further comprises two wheel modules and a propeller module, the two wheel modules may be coupled to the vehicle chassis and be respectively located at two ends of the vehicle chassis, the propeller module may be coupled to the vehicle chassis and located at the other end of the chassis.

Preferably, the hull form chassis further comprises two extension portions, the two extension portions may be formed at the other end of the hull form chassis and extending therefrom in a direction along the rear end of the amphibious remote control vehicle and the propeller module may be configured between the two extension portions of the hull form chassis.

Preferably, the vehicle chassis may be made of plastic and the hull form chassis may be made of plastic.

For the purpose of explaining the aforementioned purposes, technical features, and improvements of the present invention more obvious and understandable, the following description shall be explained in more detail with reference to the preferred embodiments together with related drawings.

DETAILED DESCRIPTION

Figure 1:
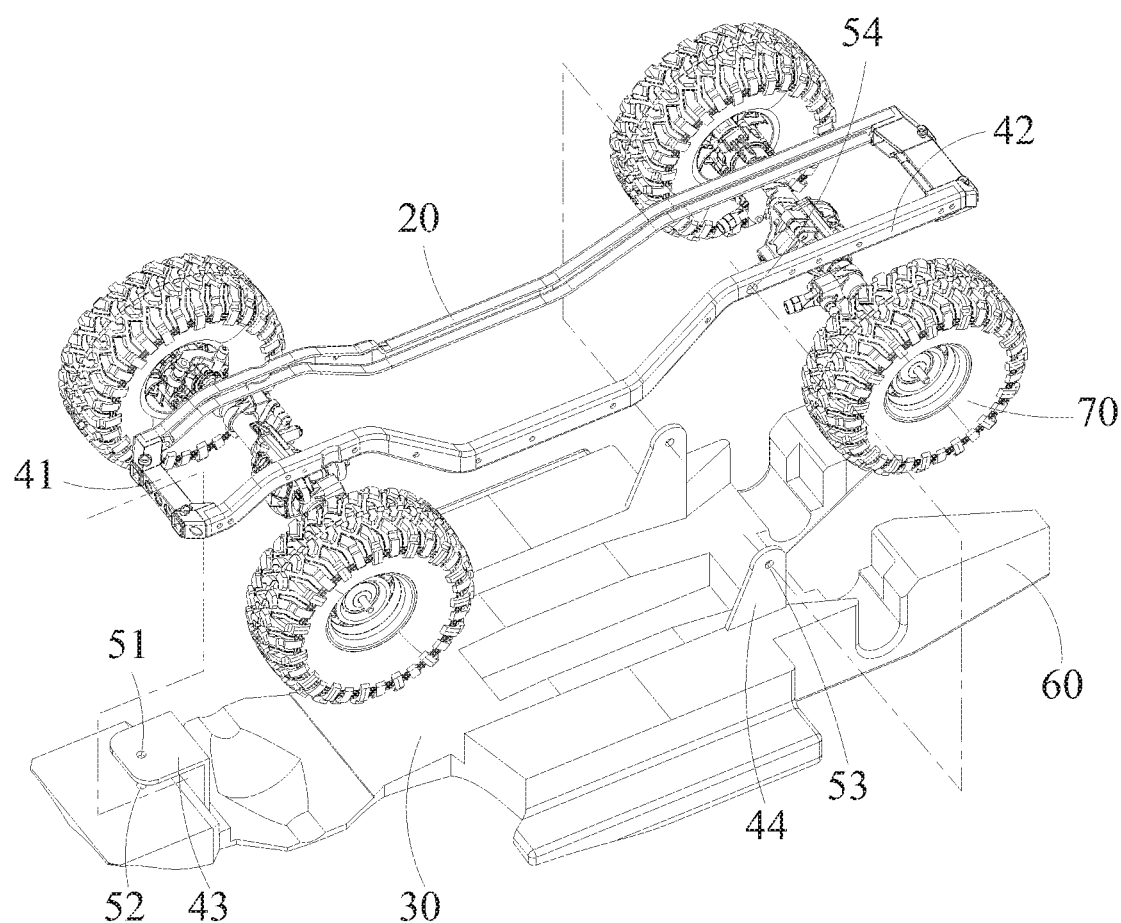
FIG. 1 depicts a schematic diagram showing the structural configuration of a chassis system of an amphibious remote control vehicle according to the present invention.

In the present invention, it should be noted that the terms "the first," "the second," "the third," "the fourth," "configure," "concave," "connect," "accommodating," "combine," and "drive" should be generally understood unless there is a specific regulation or restriction. The specific meanings of the aforementioned terms in the present invention shall specifically be understood by a person of ordinary skill in the art.

The embodiments of the chassis system of an amphibious remote control vehicle of the present invention are to be explained with reference to the related drawings. For ease of understanding, the same elements in the following embodiments are symbolized by the same reference numerals.

Figure 2:
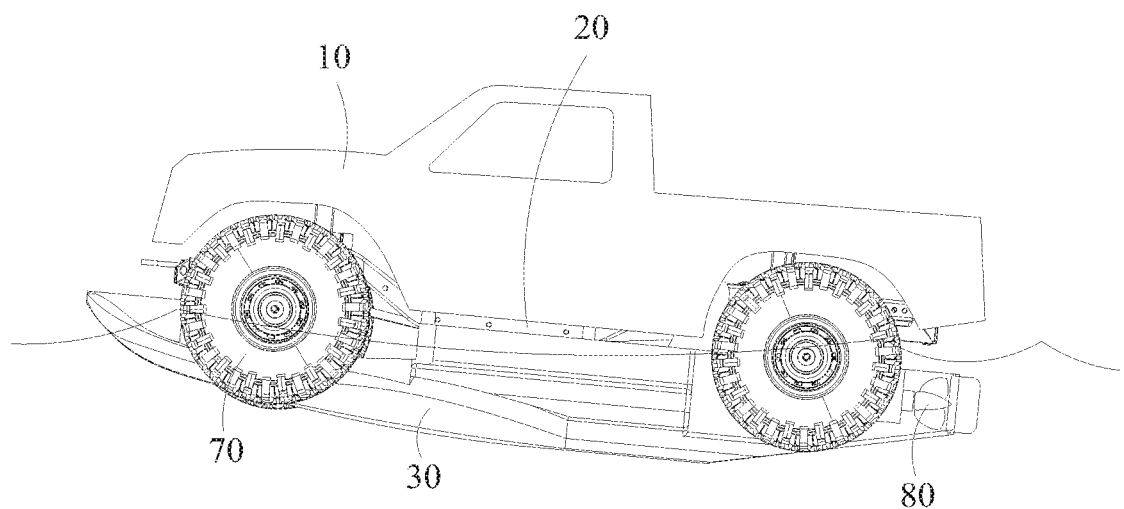
FIG. 2 depicts a schematic diagram showing the structural combination of a chassis system of an amphibious remote control vehicle according to the present invention.

Please refer to FIG. 1 and FIG. 2. FIG. 1 depicts a schematic diagram showing the structural configuration of a chassis system of an amphibious remote control vehicle according to the present invention. FIG. 2 depicts a schematic diagram showing the structural combination of a chassis system of an amphibious remote control vehicle according to the present invention. As shown in FIGS. 1 and 2, the present invention aims to provide a chassis system of an amphibious remote control vehicle 10 comprising a vehicle chassis 20 and a hull form chassis 30. The vehicle chassis 20 comprises a first joint portion 41 and the second joint portion 42, the first joint portion 41 is disposed at one end of the vehicle chassis 20 and a second joint portion 42 is disposed at the other end of the vehicle chassis 20. The width of one end of the hull form chassis 30 is smaller than that of the other end of the hull form chassis 30, the one end of the hull form chassis 30 corresponds to the front end of the amphibious remote control vehicle 10, the other end of the hull form chassis 30 corresponds to the rear end of the amphibious remote control vehicle 10. The hull form chassis 30 further comprises a third joint portion 43 and a fourth joint portion 44. The third joint portion 43 is disposed at one end of the hull form chassis 30 and corresponds to the first joint portion 41, and fourth joint portions 44 are disposed at the other end of the hull form chassis 30 and correspond to the second joint portion 42. The first joint portion 41 is engaged with the third joint portion 43, and the second joint portion 42 and the two fourth joint portion 44 are combined by a fixing member, and then the hull form chassis 30 is fixedly attached to the vehicle chassis 20.

The hull form chassis 30 comprises a hull form chassis centerline configured along an axial direction of the hull form chassis 30 relatives to the vehicle chassis 20, the hull form chassis centerline extends obliquely to two sides of the hull form chassis to form two inclined surfaces, and the hull form chassis 30 then looks like V-shaped in a front view. With this structural configuration, the resistance against the hull form chassis 30 while traveling on water can be reduced by means of the two inclined surfaces, so that the energy consumption of the amphibious remote control vehicle can be further reduced.

According to an embodiment of the present embodiment, the one end of the vehicle chassis 20 may correspond to the front end of the amphibious remote control vehicle 10 and the other end of the vehicle chassis 20 may correspond to the rear end of the amphibious remote control vehicle 10.

According to an embodiment of the present invention, the third joint portion 43 may be a plate member extending from a side of the hull form chassis 30 in a direction toward the vehicle chassis 20, and the third joint portion 43 may have an L-shaped structure and may include a first fixing hole 51, the first fixing hole 51 may be disposed on one side of the L-shaped structure parallel to the hull form chassis 30, and the hull form chassis 30 may include a second fixing hole 52, and the second fixing hole 52 may be disposed correspondingly to the first fixing hole 51, wherein when the first joint portion 41 is engaged with the third joint portion 43, the first fixing hole 51 and the second fixing hole 52 are bored by a fixing element in order to further fix the first joint portion 41 and the third joint portion 43 which are engaged with each other. With this structural design, the first joint portion 41 and the third joint portion 43 of the present invention can be prevented from being detached due to shaking effect during the vehicle driving.

According to an embodiment of the present invention, the two fourth joint portions 44 may be plate members extending from a side of the hull form chassis 30 in a direction toward the vehicle chassis 20, and each fourth joint portion 44 may have a third fixing hole 53, and each sides of the second joint portion 42 may respectively include a fourth fixing hole 54, wherein when the second joint portion 42 is engaged with the fourth joint portion 44, each third fixing hole 53 and each fourth fixing hole 54 is bored by the fixing member in order to further fix the second joint portion 42 and the fourth joint portion 44.

According to an embodiment of the present invention, the amphibious remote control vehicle 10 further comprises two wheel modules 70 and a propeller module 80, the two wheel modules 70 may be coupled to the vehicle chassis 20 and be respectively located at two ends of the vehicle chassis 20, the propeller module 80 may be coupled to the vehicle chassis 20 and located at the other end of the chassis 20. When the amphibious remote control vehicle 10 is driving on land, it can be driven by the two wheel modules 70 as a power transmission mechanism, and when the amphibious remote control vehicle 10 is driven on water, the hull form chassis 30 can be fixed to the vehicle chassis 20 and it can be driven by the propeller module 80 as a power transmission mechanism on water.

According to an embodiment of the present invention, the hull form chassis 30 further comprises two extension portions 60, the two extension portions 60 may be formed at the other end of the hull form chassis 30 and extending therefrom in a direction along the rear end of the amphibious remote control vehicle 10 and the propeller module 80 may be configured between the two extension portions 60 of the hull form chassis 30. With this structural design, the effect of the stream current separation of the hull form chassis 30 can be effectively maintained, and the proper working space of the propeller of the propeller module 80 can be effectively conserved.

According to an embodiment of the present invention, the vehicle chassis 20 may be made of plastic, and the hull form chassis 30 may also be made of plastic. By means of making the vehicle chassis 20 and the hull form chassis 30 of plastic, the advantages for the amphibious remote control vehicle 10 to float on water is secured because the overall weight is lighter, therefore the energy consumption required can be reduced.

The amphibious remote control vehicle 10 according to the present invention includes the hull form chassis 30 connected to the vehicle chassis 20, and the first joint portion 41 of the vehicle chassis 20 can be engaged to the third joint portion 43 of the hull form chassis 30, and the first joint portion 41 can be engaged with the third joint portion 43 by the first fixing hole 51 and the second fixing hole 52 being bored by a fixing element and the second joint portion 42 of the vehicle chassis 20 can be engaged with the fourth joint portion 44 of the hull form chassis 30 by each third fixing hole 53 and each fourth fixing hole 54 being bored respectively. With this structural design, the hull form chassis 30 can be effectively fixed with the vehicle chassis 20. Besides, by combining the hull form chassis 30 to the vehicle chassis 20 which both are made of plastic, the buoyancy force can be provided to the amphibious remote control vehicle 10 while driven on the surface of water, and the detachable design can also be conveniently replaced by the user when the hull form chassis 30 is damaged.

Furthermore, the width of one end of the hull form chassis 30 is smaller than that of the other end of the hull form chassis 30, and the hull form chassis 30 comprises a hull form chassis centerline configured along an axial direction of the hull form chassis 30 relatives to the vehicle chassis 20, the hull form chassis centerline extends obliquely to two sides of the hull form chassis to form two inclined surfaces, so the hull form chassis 30 then looks like V-shaped in a front view. With this structural configuration, the resistance against the hull form chassis 30 while traveling on water can be reduced by means of the V-shaped structure and the effect of the separation of the stream current, so that the energy consumption of the amphibious remote control vehicle can be further reduced. However, the aforementioned descriptions are only explained as examples and not restricted thereto.

The above description is merely illustrative rather than restrictive. Any equivalent modification or alteration without departing from the spirit and scope of the present invention should be included in the appended claims.

What is claimed is:

1. A chassis system of an amphibious remote control vehicle, comprising:
    a vehicle chassis, comprising:
        a first joint portion disposed at one end of the vehicle chassis; and
        a second joint portion disposed at one other end of the vehicle chassis;
    a hull form chassis, wherein a width of one end of the hull form chassis is smaller than that of one other end of the hull form chassis, the one end of the hull form chassis corresponds to a front end of the amphibious remote control vehicle, the other end of the hull form chassis corresponds to a rear end of the amphibious remote control vehicle, the hull form chassis further comprising:
        a third joint portion disposed at the one end of the hull form chassis being corresponding to the first joint portion; and
        two fourth joint portions disposed at the other end of the hull form chassis being corresponding to the second joint portion;
    wherein the hull form chassis comprises a hull form chassis centerline configured along an axial direction of the hull form chassis relative to the vehicle chassis, the hull form chassis centerline extends obliquely to two sides of the hull form chassis to form two inclined surfaces, and the hull form chassis is V-shaped in a front view, wherein the first joint portion is engaged with the third joint portion, and the second joint portion and the two fourth joint portion are combined by a fixing member, and the hull form chassis is fixedly attached to the vehicle chassis.

2. The chassis system of an amphibious remote control vehicle according to claim 1, wherein the one end of the vehicle chassis corresponds to the front end of the amphibious remote control vehicle and the other end of the vehicle chassis corresponds to the rear end of the amphibious remote control vehicle.

3. The chassis system of an amphibious remote control vehicle according to claim 1, wherein the third joint portion is a plate member extending from a side of the hull form chassis in a direction toward the vehicle chassis, and the third joint portion has an L-shaped structure and includes a first fixing hole, the first fixing hole is disposed on one side of the L-shaped structure parallel to the hull form chassis, and the hull form chassis includes a second fixing hole, and the second fixing hole is disposed correspondingly to the first fixing hole, wherein when the first joint portion is engaged with the third joint portion, the first fixing hole and the second fixing hole are bored by a fixing element in order to further fix the first joint portion and the third joint portion which are engaged with each other.

4. The chassis system of an amphibious remote control vehicle according to claim 1, wherein the two fourth joint portions are plate members extending from a side of the hull form chassis in a direction toward the vehicle chassis, and each fourth joint portion has a third fixing hole, and each sides of the second joint portion includes a fourth fixing hole, wherein when the second joint portion is engaged with the fourth joint portion, each third fixing hole and each fourth fixing hole is bored by the fixing member in order to further fix the second joint portion and the fourth joint portion.

5. The chassis system of an amphibious remote control vehicle according to claim 1, wherein the amphibious remote control vehicle further comprises two wheel modules and a propeller module, the two wheel modules are coupled to the vehicle chassis and are respectively located at two ends of the vehicle chassis, the propeller module is coupled to the vehicle chassis and located at the other end of the chassis.

6. The chassis system of an amphibious remote control vehicle according to claim 5, wherein the hull form chassis further comprises two extension portions, the two extension portions are formed at the other end of the hull form chassis and extending therefrom in a direction along the rear end of the amphibious remote control vehicle and the propeller module is configured between the two extension portions of the hull form chassis.

7. The chassis system of an amphibious remote control vehicle according to claim 1, wherein the vehicle chassis is made of plastic.

8. The chassis system of an amphibious remote control vehicle according to claim 1, wherein the hull form chassis is made of plastic.

* * * * *